(12) United States Patent
Gonyou et al.

(10) Patent No.: US 10,995,954 B2
(45) Date of Patent: *May 4, 2021

(54) GAS TURBINE ENGINE WITH IGNITER STACK OR BORESCOPE MOUNT HAVING NONCOLLINEAR COOLING PASSAGES

(71) Applicant: General Electric Company, Schenectady, NY (US)

(72) Inventors: Craig Alan Gonyou, Blanchester, OH (US); William Thomas Bennett, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 485 days.

This patent is subject to a terminal disclaimer.

(21) Appl. No.: 16/170,981

(22) Filed: Oct. 25, 2018

(65) Prior Publication Data

US 2019/0154260 A1    May 23, 2019

Related U.S. Application Data

(63) Continuation of application No. 14/969,372, filed on Dec. 15, 2015, now Pat. No. 10,145,559.

(51) Int. Cl.
*F23R 3/60* (2006.01)
*F23R 3/00* (2006.01)
(Continued)

(52) U.S. Cl.
CPC ............... *F23R 3/002* (2013.01); *F23R 3/06* (2013.01); *F23R 3/16* (2013.01); *F23R 3/283* (2013.01);
(Continued)

(58) Field of Classification Search
CPC .... F23R 3/002; F23R 3/06; F23R 3/16; F23R 3/283; F23R 3/60; F23R 2900/00012
See application file for complete search history.

(56) References Cited

U.S. PATENT DOCUMENTS 3,800,530 A    4/1974  Nash
3,990,834 A    11/1976 DuBell et al.
(Continued)

FOREIGN PATENT DOCUMENTS

CN    1892000 A    6/2010
CN    102667346 A    9/2014
(Continued)

OTHER PUBLICATIONS

Chinese Patent Office, Office Action re Chinese Patent Application No. 201611273052.1, dated Oct. 8, 2018, 10 pages, China.
(Continued)

*Primary Examiner* — Steven M Sutherland
(74) *Attorney, Agent, or Firm* — McGarry Bair PC

(57) ABSTRACT

A combustor for a gas turbine engine comprising a combustion liner defining a combustion chamber, wherein the combustion liner has at least one opening into which a combustor liner mount is received. The combustor liner mount can have at least one cooling passage defined therein having an inlet defining an inlet axis and an outlet defining an outlet axis, wherein the inlet axis is not collinear with the outlet axis for providing enhanced cooling to at least one of the combustor liner mount and an adjacent combustion component, such as an igniter or a borescope plug.

20 Claims, 8 Drawing Sheets

(51) Int. Cl.
*F23R 3/06* (2006.01)
*F23R 3/28* (2006.01)
*F23R 3/16* (2006.01)

(52) U.S. Cl.
CPC ...... *F23R 3/60* (2013.01); *F23R 2900/00012* (2013.01); *F23R 2900/00017* (2013.01); *Y02T 50/60* (2013.01)

(56) References Cited

U.S. PATENT DOCUMENTS

| | | | |
|---|---|---|---|
| 4,409,791 | A | 10/1983 | Jourdain et al. |
| 6,715,279 | B2 | 4/2004 | White |
| 7,101,173 | B2 | 9/2006 | Hernandez et al. |
| 7,216,488 | B2 | 5/2007 | Howell et al. |
| 7,546,739 | B2 | 6/2009 | Holland et al. |
| 8,181,440 | B2 | 5/2012 | Sandelis |
| 8,479,490 | B2 | 7/2013 | Zupanc et al. |
| 9,080,771 | B2 | 7/2015 | Bunel et al. |
| 2010/0212324 | A1 | 8/2010 | Bronson et al. |
| 2011/0289928 | A1 | 12/2011 | Fox et al. |
| 2014/0126995 | A1 | 5/2014 | Schick et al. |
| 2014/0144148 | A1 | 5/2014 | Jause et al. |
| 2014/0216042 | A1 | 8/2014 | Hanson |
| 2014/0367495 | A1 | 12/2014 | Monaghan et al. |
| 2015/0113993 | A1 | 4/2015 | Rudrapatna et al. |
| 2015/0226433 | A1 | 8/2015 | Dudebout et al. |
| 2016/0290643 | A1* | 10/2016 | Cunha ................ F02C 7/24 |

FOREIGN PATENT DOCUMENTS

| | | |
|---|---|---|
| FR | 2958373 A1 | 10/2011 |
| WO | 2015/085065 A1 | 6/2015 |
| WO | 2015/147929 A2 | 10/2015 |

OTHER PUBLICATIONS

Extended European Search Report and Opinion issued in connection with corresponding EP Application No. 16203340.1 dated May 12, 2017.

Office Action issused in connection with corresponding CA Application No. 2951093 dated Oct. 2, 2017.

Gonyou, C.A. et al., Inleakage management apparatus, GE copending U.S. Appl. No. 15/622,262, filed Jun. 14, 2017.

* cited by examiner

GAS TURBINE ENGINE WITH IGNITER STACK OR BORESCOPE MOUNT HAVING NONCOLLINEAR COOLING PASSAGES

CROSS-REFERENCE TO RELATED APPLICATION

This application is a continuation of U.S. application Ser. No. 14/969,372, filed on Dec. 15, 2015, now U.S. Pat. No. 10,145,559, titled "GAS TURBINE ENGINE WITH IGNITER STACK OR BORESCOPE MOUNT HAVING NONCOLLINEAR COOLING PASSAGES", which is hereby expressly incorporated herein by reference in its entirety.

BACKGROUND OF THE INVENTION

Turbine engines, and particularly gas or combustion turbine engines, are rotary engines that compress inlet air through a series of compressor stages, which include pairs of rotating blades and stationary vanes, into a combustor in which fuel is added and burned, and then onto a multitude of turbine blades and vanes. In the compressor stages, blades extend into the flowpath from the rotor while the vanes are mounted to stator. Gas turbine engines have been used for land and nautical locomotion and power generation, but are most commonly used for aeronautical applications such as for airplanes, including helicopters. In airplanes as well as helicopters, gas turbine engines are used for propulsion of the vehicle.

The combustor of a gas turbine engine typically has an igniter for igniting fuel in the combustor, and often has one or more borescope ports, which allow service technicians to view internals of the gas turbine engines. The igniter assembly typically includes a series of stacked components for aligning the igniter within the combustor and allowing for thermal growth differences between the outer case and the hot side flowpath. Further, each borescope port may include a series of stacked components, which are closed by a borescope plug. Borescope plugs occur in all regions of the gas turbine engine. They may need to be cooled in the compressor aft stages, the combustor as well as the turbines. Due to the high operation temperatures, cooling holes are typically provided in the components for the igniter and borescope ports to attempt to prevent excessive temperatures and damage to these components. Current attempts to cool the igniter and bore scope ports do not provide adequate cooling to the portion of the igniter, bore scope port, and its corresponding mount, at areas directly adjacent to the hot side flowpath inside the gas turbine engine, which can have temperatures in excess of 3,000° F.

BRIEF DESCRIPTION OF THE INVENTION

In one aspect, various embodiments of the invention relate to a combustor for a gas turbine engine comprising: a combustion liner defining a combustion chamber, wherein the combustion liner has at least one opening; a combustor liner mount received in the at least one opening of the combustor liner, comprising at least one cooling passage defined within the combustor liner mount having an inlet defining an inlet axis and an outlet defining an outlet axis, wherein the inlet axis is not collinear with the outlet axis; and a combustor component received in the combustor liner mount, wherein the combustor component has an inward portion in register with the combustion chamber and adjacent to the outlet; whereby a flow of cooling air external the combustion liner is provided to the inlet, passes through the at least one cooling passage, and exits the outlet to cool at least one of the combustor liner mount and the combustor component.

In another aspect, various embodiments of the invention relate to a combustor liner mount for a gas turbine engine for received in an at least one opening of a combustor liner having at least one cooling passage defined therein, the at least one cooling passage having an inlet defining an inlet axis at an exterior portion of the combustor liner mount and an outlet defining an outlet axis at an interior portion of the combustor liner, wherein the at least one cooling passage has a vertically-offset or non-collinear portion between inlet and outlet ends thereof.

In another aspects, various embodiments of the invention relate to a combustor for a gas turbine engine comprising: a combustion liner defining a combustion chamber, wherein the combustion liner has at least one opening; a combustor liner mount received in the at least one opening of the combustor liner, comprising at least one cooling passage defined within the combustor liner mount, wherein the at least one cooling passage has a vertically offset or non-collinear portion between inlet and outlet ends thereof; a combustor component received in the combustor liner mount comprising: a tower; a tower cap; and a ferrule; wherein these components are axially aligned in a stacked relationship disposed around the at least one opening of the combustion liner, wherein the combustor component has an inward portion in register with the combustion chamber and adjacent to the outlet; whereby cooling air flowing adjacent to the combustion liner is received in part within the inlet end, passes through the at least one cooling passage, and exits the outlet end to provide cooling to at least one of the combustor liner mount and the combustor component.

DESCRIPTION OF EMBODIMENTS OF THE INVENTION

Figure 1:
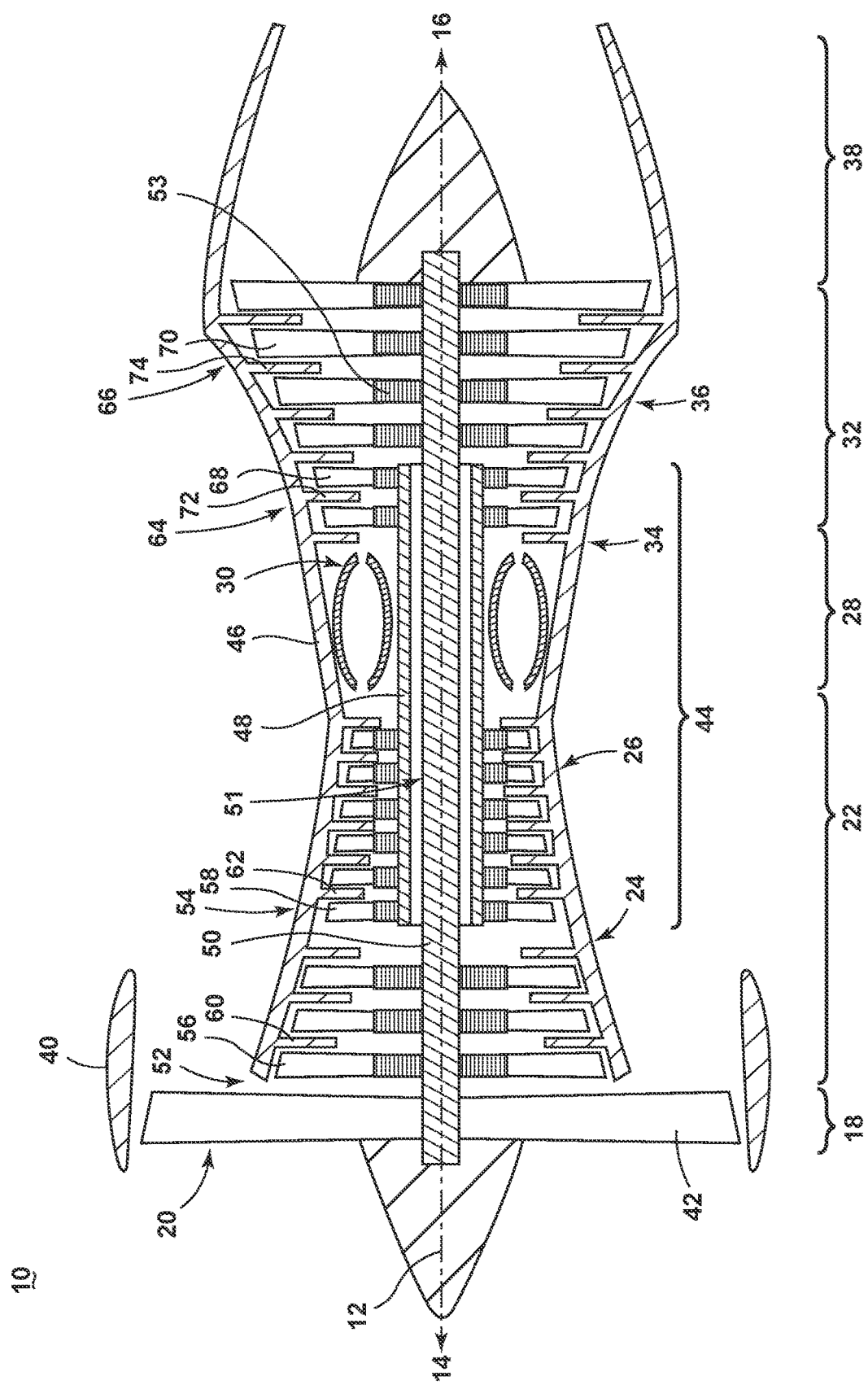
FIG. 1 is a schematic, sectional view of a gas turbine engine.

The described embodiments of the present invention are directed to systems, methods, and other devices related to routing air flow in a turbine engine. For purposes of illustration, the present invention will be described with respect to an aircraft gas turbine engine. It will be understood, however, that the invention is not so limited and can have general applicability in non-aircraft applications, such as other mobile applications and non-mobile industrial, commercial, and residential applications.

It should be further understood that while the invention is described with respect to an ignitor, it should not be construed as limiting and that this invention is equally applicable to other combustor components, such as a borescope plug and its associated hardware.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline.

Additionally, as used herein, the terms "radial" or "radially" refer to a dimension extending between a center longitudinal axis of the engine and an outer engine circumference. Higher pressure in this design is radially outward from post-combustion gases.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are also referred to individually or collectively as a rotor 51.

The LP compressor 24 and the HP compressor 26 respectively include a plurality of compressor stages 52, 54, in which a set of compressor blades 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, with each stage having its own disk. The vanes 60, 62 are mounted to the core casing 46 in a circumferential arrangement about the rotor 51.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 can bypass the engine core 44 and be used for cooling of portions, especially hot portions, of the engine 10, and/or used to cool or power other aspects of the aircraft. In the context of a turbine engine, the hottest portions of the engine are in the combustor and temperatures decrease downstream of the combustor 30 as work is extracted in the rotor system and cooling air is introduced into the hot flowpath. The turbine section 32, with the first HP turbine nozzle 34 being the hottest portion of the turbine as it is directly downstream of the combustion section 28. Other sources of cooling fluid can be, but is not limited to, fluid discharged from the LP compressor 24 or the HP compressor 26.

Figure 2:
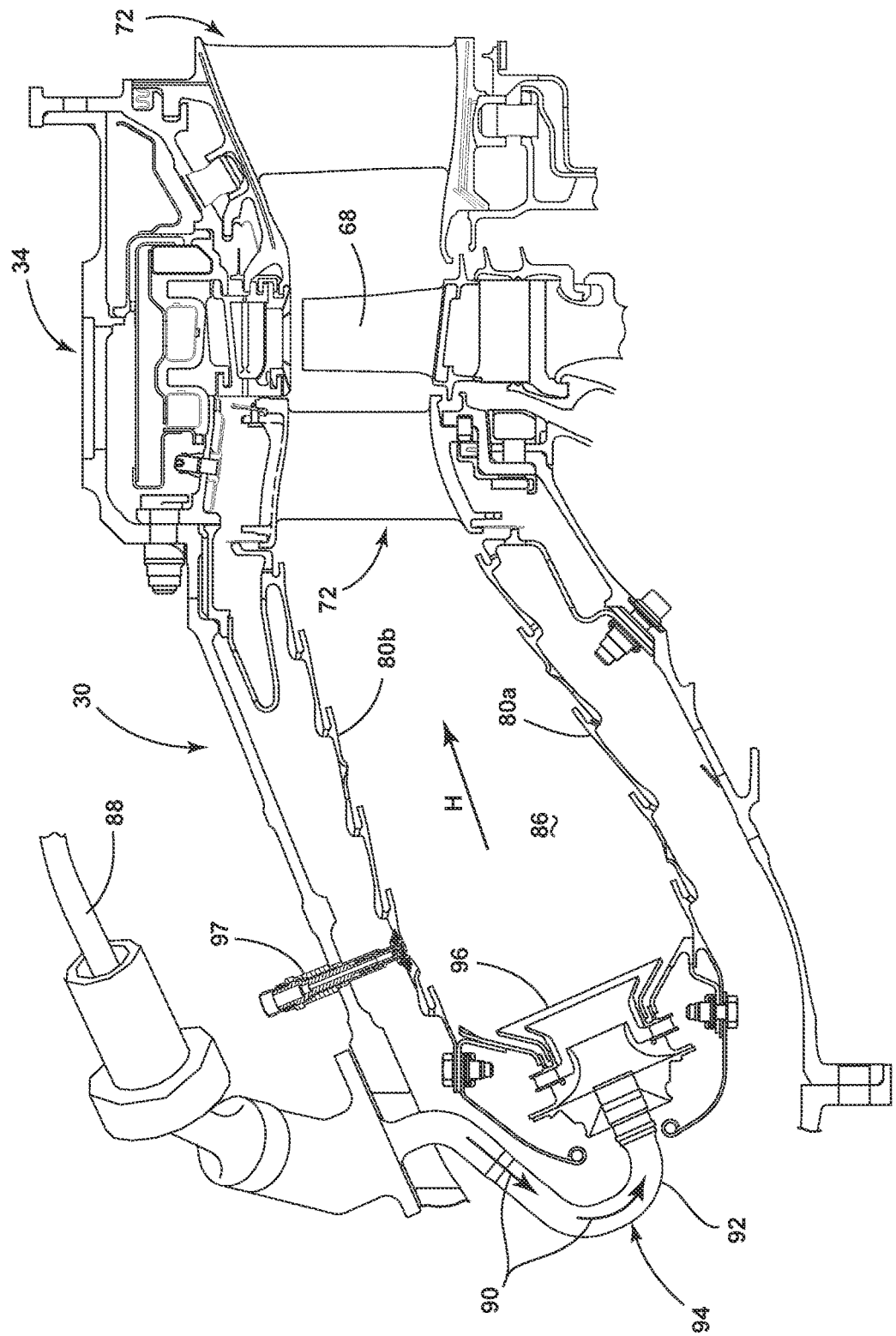
FIG. 2 is an enlarged, schematic cross-sectional view of a combustion section of the gas turbine engine from FIG. 1 illustrating a combustor liner mount, such as an igniter tower stack.

FIG. 2 is a schematic, side-section view of the combustion section 28 spanning from the end of the compressor section 22 to the turbine section 32 of FIG. 1. The combustor 30 includes combustion inner and outer liners 80a and 80b defining a combustion chamber 86 in fluid communication with HP compressor 26 and HP turbine 34. A fuel source 88 provides a supply of fuel 90 through a supply line 92 to fuel-air mixer 96. At the fuel-air mixer 96 mixes the fuel 90 with a supply of compressed air 94 from the HP compressor 26 generating a fuel-air mixture. A combustor component 97, exemplarily illustrated as an igniter located in the combustion outer liner 80b ignites the fuel-air mixture and the combustion process starts, generating a flow of hot gases H. Once the combustion process starts ignition is complete. The fuel-air mixer 96 is configured to sustain the combustion process with steady supply of the compressed air 94 and fuel 90. In the combustion chamber 86, energy is released when compressed cooling air 94 is mixed with fuel 90 and ignited within the combustion chamber 86. The resulting flow of hot gases H from combustor 30 is directed over turbine blades 68, 70, inducing the rotation of turbine blades 68, 70. The energy of the flow of working fluid is transformed into the mechanical energy.

It should be appreciated that while this description and related drawings are related to an igniter, the invention is not so limited. Additional components, such as borescope plugs, may also need similar cooling around the hole in the outer liner in which the plug is assembled. A typical gas turbine engine will have at least two igniters in the combustor and a minimum of at least one borescope plug, although it will be apparent to one skilled in the art that additional or fewer igniters or borescope plugs can be employed in a gas turbine engine without departing from the scope of this invention. More often, there are anywhere from two to six borescope plugs in the combustor, as well as additional plugs in the HP compressor, HP turbine and LP turbine. Some or all of these plugs may incorporate the features described herein with respect to the invention as would be apparent to one skilled in the art. The igniter is but one example of a combustor component and is utilized to facilitate the reader's understanding of the inventive concept.

Figure 3:
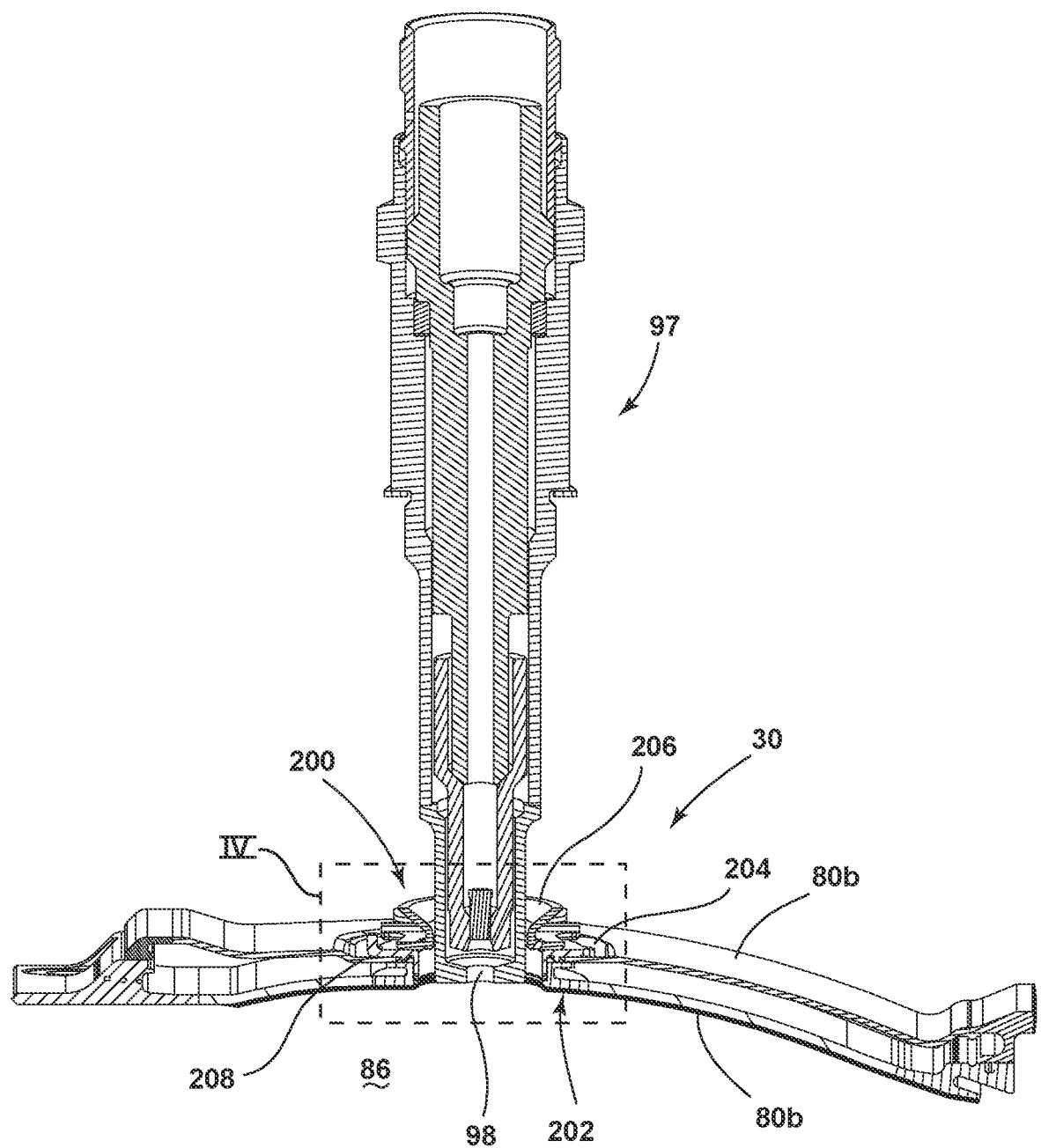
FIG. 3 shows a cross-sectional view of area A of FIG. 2 illustrating an igniter portion extending into a combustion chamber.

Turning now to FIG. 3, a cross-sectional view of the combustor component 97 is shown extending from the outer liner 80b. The combustor component 97 is located within a combustion liner mount 200 exemplarily illustrated as an ignitor tower stack comprising an ignitor tower 202, a tower cap 204, and a ferrule 206 which may collectively be referred to as 'the ignitor tower stack' hereinafter. The ignitor tower 202, tower cap 204, and ferrule 206 are disposed in axial alignment in a stacked relationship. The combustion liner mount 200 can be substantially annular, defining an opening 207 in the liner 80b of the combustor 30. A tip 98 of the combustor component 97 is disposed within the ignitor tower stack 200 received in the opening 207.

Figure 4:
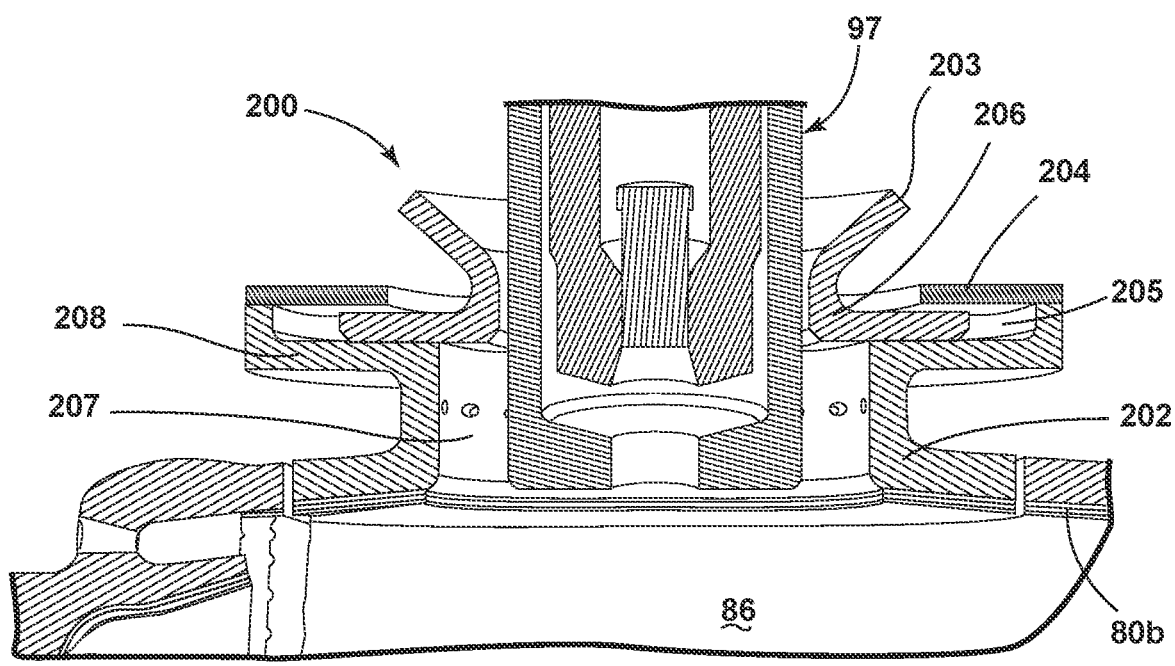
FIG. 4 is an enlarged portion of the area marked IV of FIG. 3 illustrating a an igniter, and an igniter tower stack, showing a tip of the igniter extending into the combustion chamber with a plurality of cooling passages in the combustor liner mount.

FIG. 4 shows an enlarged view of the combustion liner mount 200. As is best seen in FIG. 4, the igniter tower 202 can mount to the outer combustion liner 80b. The igniter tower cap 204 mounts to the igniter tower 202 opposite of the outer combustion liner 80b, and defines an annular gap 205 between the igniter tower 202 and the tower cap 204. The ferrule 206 is partially disposed within the gap 205, securing the ferrule 206 between the igniter tower 202 and the tower cap 204. The ferrule 206 further comprises a tapered flange 203 extending above the tower cap 204. Thus, the stacked arrangement of the igniter tower stack can be understood. Each piece of the igniter tower stack 200 can be annular such that the opening 207 is defined for providing the combustor component 97 to the combustion chamber 86.

While the drawings of this application illustrate the use of an ignitor within an ignitor tower stack to illustrate the invention, it would be apparent to one skilled in the art that the ignitor and ignitor tower stack for the combustion liner 80 are exemplary and should not be construed as limiting. Alternatively, the opening 207 could also comprise a borescope opening, which is typically closed by a borescope plug during operation. For example, one skilled in the art would need merely substitute a borescope plug for an ignitor to apply the concepts for cooling the combustor liner mount and the combustor component as described herein to a borescope plug.

FIGS. 5-11 show several examples of one or more cooling passages 208 disposed within at least one component of the combustor liner mount 200. It should be understood that the embodiments illustrated in FIGS. 5-11 provide six separate embodiments for organizing the cooling passages 208 in a vertically-offset or non-collinear manner. As such, the cooling passages 208 can at least partially comprise a vertically-offset or non-collinear portion, inlet and outlets therefor being, for example, non-collinear throughout.

In FIGS. 5-11, the separate embodiments can be substantially similar to one another and similar elements will be identified with similar numerals. It will be understood that the cooling passages 208 shown are for illustrative purposes only and should not be construed as limiting of the invention. Other variations and configurations of the cooling passages 208 would be apparent to one skilled in the art. Furthermore, the cooling passages 208 are shown by example as provided within the igniter tower 202, tower cap 204, ferrule 206, or any combination thereof. These are particular examples and should not be construed as limiting of the scope of the invention. Furthermore, the cooling passages 208 could span across one or more of the ignitor tower stack 202, 204, 206 without departing from the scope of the invention.

It should be understood that the cooling passages 208 formed within the combustor liner mount 200 are able to convectively cool portions of the ignitor tower stack 202, 204, 206 as well as emit cooling air out onto a functional portion of the combustor component 97, such as the igniter tip 98, for example. The air cooling passages 208 can comprise non-collinear or offset passages to provide cooling to both the combustor liner mount 200 and the combustor component 97. It will be understood that the ignitor tower stack 202, 204, 206 could be formed by any suitable manufacturing processes, such as laser boring, metal printing, or adaptive manufacturing, in non-limiting examples, to provide the complex cooling passage shapes within the ignitor tower stack 202, 204, 206.

In FIGS. 5-11, the cooling passages 208 are provided in the combustion liner mount 200 having an inlet 210 and an outlet 212. The inlet 210 is located on at an exterior portion of one of the ignitor tower stack 202, 204, 206 for receipt of cooling air from external of the combustion chamber 86. The outlet 212 is preferably located at an interior portion of the combustor liner mount 200, generally in registry with the combustor component 97 when the combustor component 97 is disposed within the combustor liner mount 200.

It should be understood that the cooling air can be provided from a pre-impingement portion of the combustor liner or a post-impingement portion of the combustor liner and the particular manner in which cooling air is routed to the combustor liner mount 200 shall not be construed as limiting the scope of this invention but that any manner in which cooling air is routed to the combustor liner mount 200 is within the scope of this invention.

In order to provide cooling to the combustor component 97 when it is received within the combustor liner mount 200, the outlet 212 is generally positioned adjacent to a functional end of the combustor component 97, such as the igniter tip 98 in one example. The functional end of the combustor component 97 is located adjacent to the outlet 212 of the at least one cooling passage 208 provided in the combustor liner mount 200. In another example, when the combustor component 97 is a borescope plug, the outlet 212 of the combustor liner mount 200 is located adjacent to an inward portion of the borescope plug to provide cooling air to the portion of the borescope plug exposed to high temperatures within the combustion chamber 86 or the turbine outer walls between vanes in which a borescope plug is present.

Further, as cooling air passes from the inlet 210 to the outlet 212, the cooling passage 208 can deliver enhanced convective cooling to the combustor liner mount 200 and to the combustor component 97 through the outlet 212. One example by which this enhanced cooling is provided is with a vertically-offset or non-collinear portion of the cooling passage 208 between the inlet 210 and outlet 212. The vertically-offset or non-collinear portion can be defined, for example, by having the inlet 210 defining an inlet axis 211 and the outlet 212 defining an outlet axis 213 (see FIG. 6) such that the inlet axis 211 is not collinear with the outlet axis 213. With the offset inlet 210 and outlet 212, the path therebetween provides a greater length, and therefore surface area, for convection to occur between the cooling air passing the inlet 210 and outlet 212 thereof.

Figure 5:
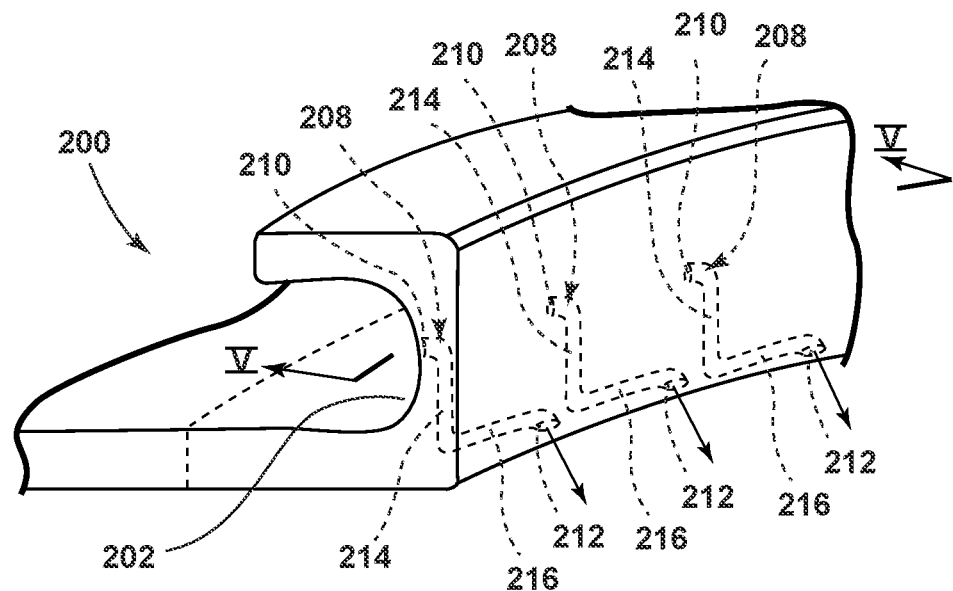
FIG. 5 is a partial, perspective view of a portion of the igniter tower shown in FIG. 4 illustrating the cooling passages according to an embodiment of the invention.
Figure 6:
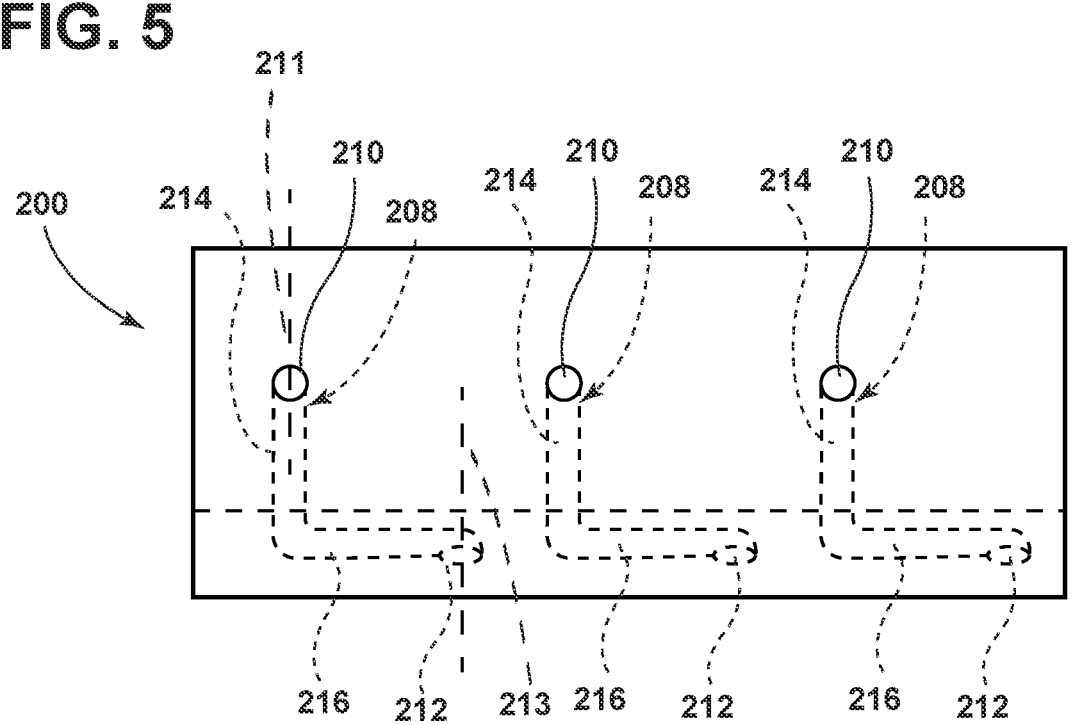
FIG. 6 is a cross-sectional view across section A-A of FIG. 5 showing an alternate view of the cooling passages.

Turning specifically to FIGS. 5-6, at least one cooling passage 208 is provided within the tower 202 according to a first embodiment of the invention. It should be understood that while three cooling passages 208 are shown, additional or fewer cooling passages 208 are contemplated within the scope of the invention. Each cooling passage 208 extends inwardly from the inlet 210 to a depending portion 214 which, in turn, fluidly communicates with a peripheral extension 216, terminating at the outlet 212. The depending portion 214 and the peripheral portion 216 can be orthogonal to one another or angularly offset. In this manner, the cooling passage 208 can provide cooling air to a vertical surface of the component 202, 204, 206 from the vertically oriented inlet 210. Additionally, convective cooling is provided to the peripheral portion 216 of the component before the cooling air exits the outlet 212 and is directed toward the combustor component 97.

Figure 7:
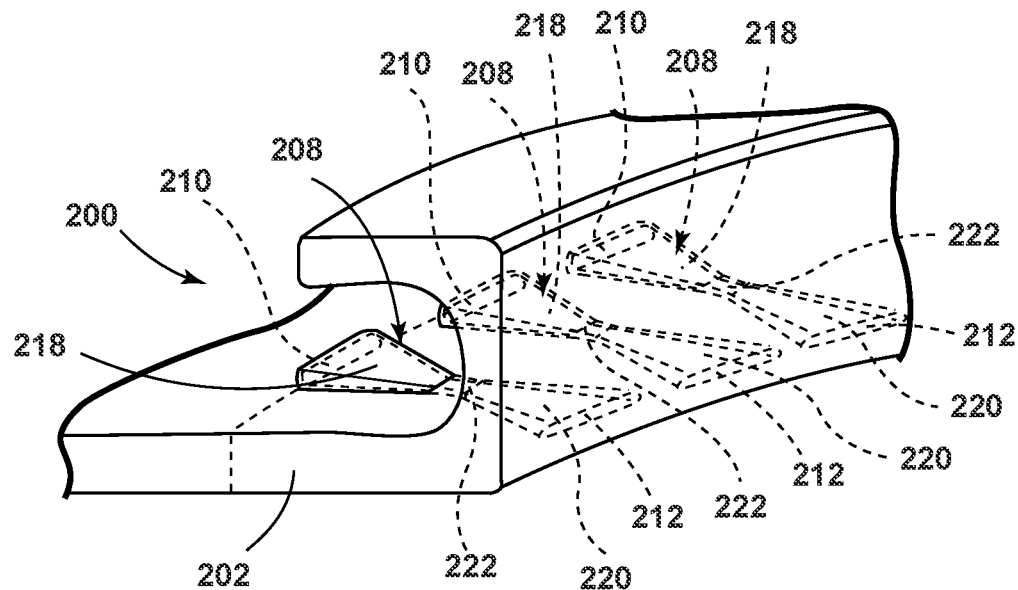
FIG. 7 is a partial, perspective view of a portion of the combustor liner mount shown in FIGS. 1-4 according to a second embodiment of the cooling passages.
Figure 7A:
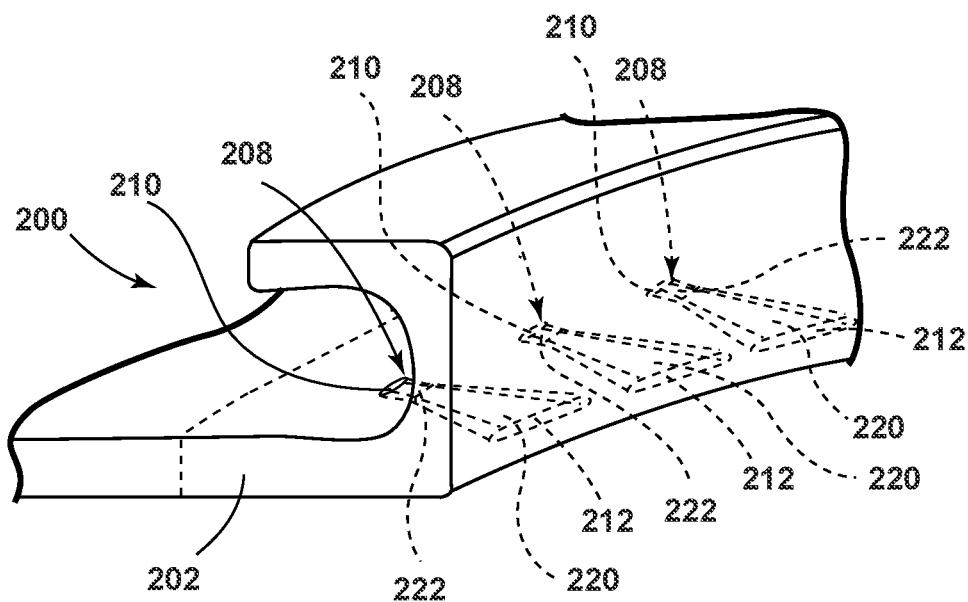
FIG. 7A is a partial, perspective view similar to the orientation of FIG. 7, showing an alternative embodiment of the cooling passages of FIG. 7, but provided with a tapered exit as shown in the drawing.

FIG. 7 shows a second embodiment of the cooling passages 208 provided in one of the ignitor tower stack 202, 204, 206 of the combustor liner mount 200; namely, the combustor tower 202. In this embodiment, the inlet 210 is provided with a converging taper 218 into the cooling passage 208. The converging taper 218 decreases in cross-sectional area defining a nozzle 222 at the minimal cross-sectional area. Opposite of the converging taper 218 at the nozzle 222, the cooling passage 208 comprises a diverging taper 220 toward the outlet 212. In this manner, additional convective cooling can be provided to the body of the component 202, 204, 206 through the additional surface area provided by the converging taper 218 of the inlet 210 and the diverging taper 220 of the outlet 212. In addition, the nozzle 222 provides a metering section to limit the airflow such that the exit airflow velocity directed towards the outlet 212 of the cooling passage 208 is reduced or minimized. FIG. 7A shows an alternative embodiment of the cooling passages of FIG. 7, but provided with a tapered exit portion adjacent to outlet 212.

Figure 8:
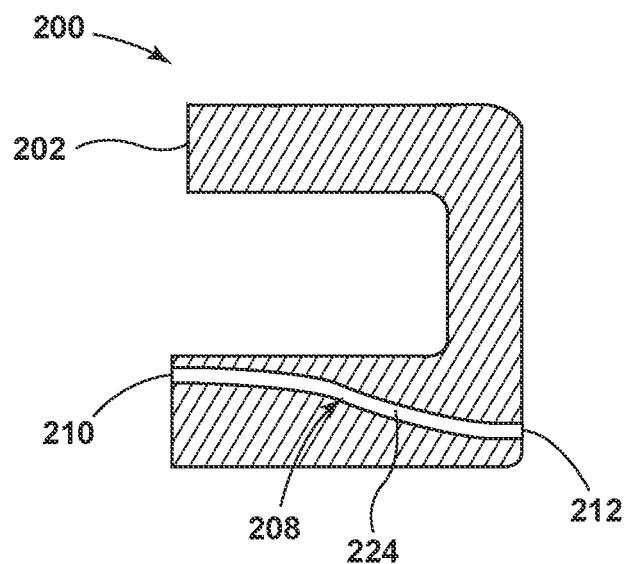
FIG. 8 is a cross-sectional view showing an example of non-linear cooling passages for the combustor liner mount and combustor component, and it will be understood that the cooling passages may also be linear in this cross-section, and could also have a tapered inlet, tapered outlet or any combination of the tapered and linear or non-linear paths.

In a third embodiment, shown in FIG. 8, the cooling passage 208 has an arcuate cross-section wherein a sloped curve 224 comprises a decreasing radial height between the inlet 210 and inlet 212 relative to the engine centerline. The sloped curve 224 between the inlet 210 and the outlet 212 can also have a tapered portion similar to the converging or diverging tapers 218, 220 of FIG. 7, such that the sloped curve 224 can comprise a converging or diverging cross-section, as well as a nozzle, to respectively meter the flow rate and control the exit velocity from cooling passage 208.

Figure 9:
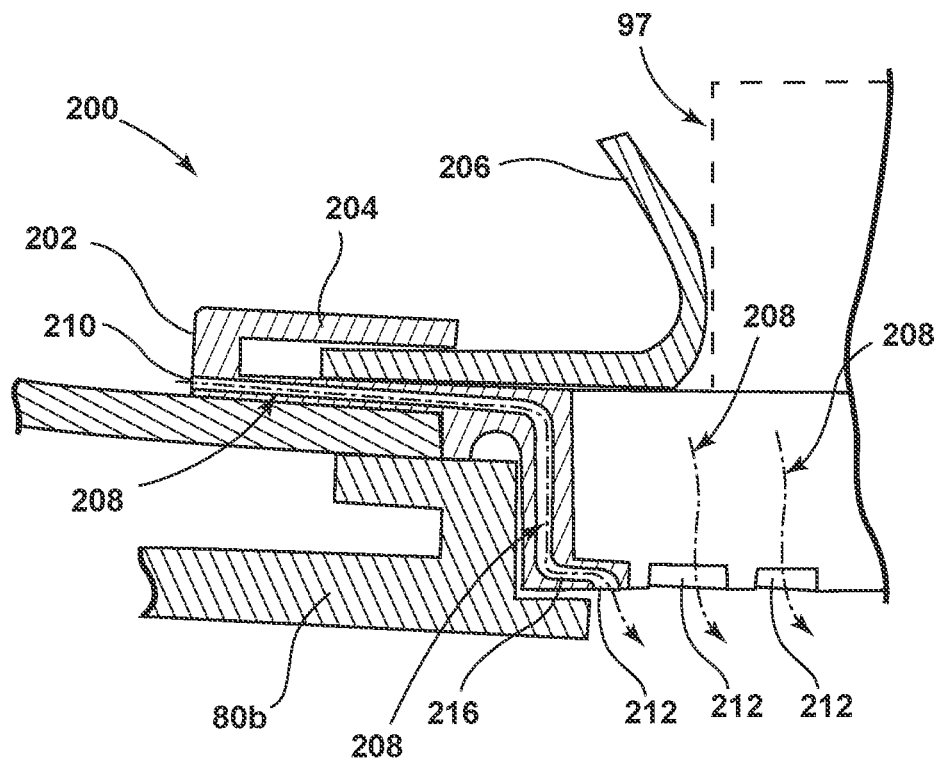
FIG. 9 is a partial-cross-sectional view illustrating multi-directional cooling passages provided within the combustor liner mount which receive cooling air from a pre-impingement cavity of the gas turbine engine according to a third embodiment.

Turning to FIG. 9, a fourth embodiment of the combustor liner mount 200 is shown in which the cooling passages 208 pass between one of the ignitor tower stack 202, 204, or 206, or more than one component 202, 204, 206. The inlet 210 can be formed in the tower 202 and the cooling passage 208 therein then feeds the depending portion 214, the peripheral portion 216, and terminates at the outlet 212. It is contemplated that a plurality of inlets 210 can be disposed around the base of the combustor tower 202 to feed a plurality of outlets 212 with cooling air to be provided to the combustor component 97 within the ferrule 206.

It should be appreciated that while the fourth embodiment as illustrated in FIG. 9 shows the cooling passages 208 in the tower 202, the cooling passages 208 can begin, pass through, or exit from any of the ignitor tower stack 202, 204, 206, or any combination thereof, and should not be limited by the exemplary illustrations and accompanying description.

Figure 10:
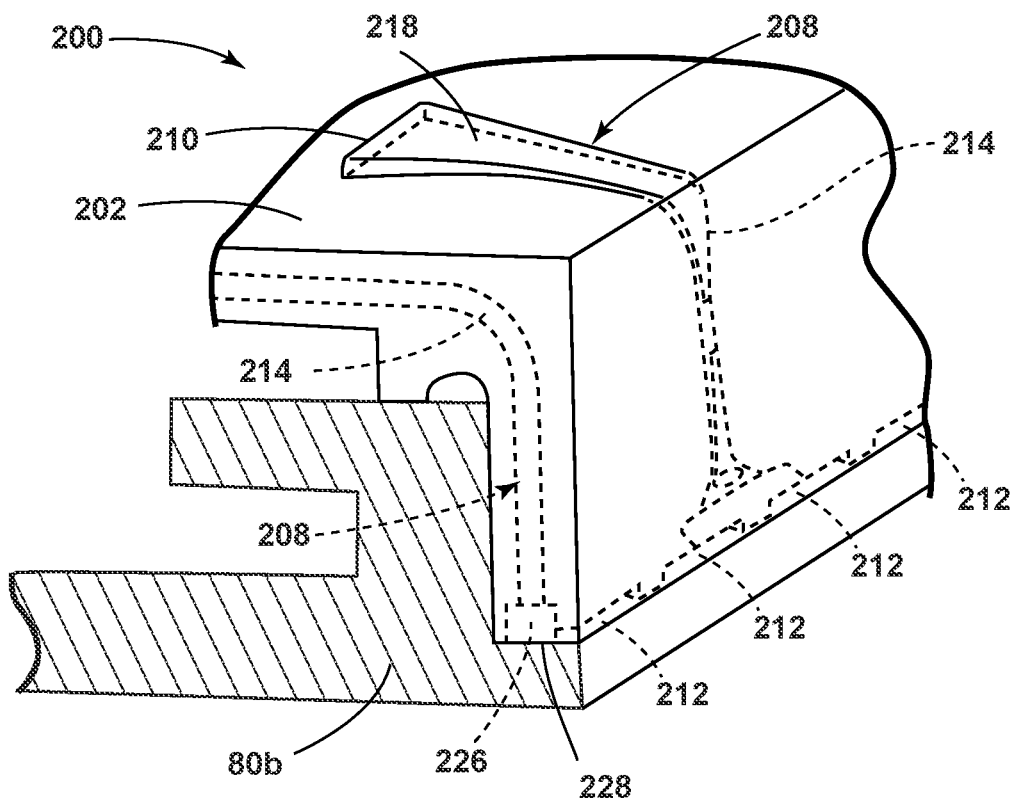
FIG. 10 is a partial, perspective view of a portion of the combustor liner mount of FIG. 9 illustrating the cooling passages according to a fourth embodiment of the invention.

In FIG. 10, a fifth embodiment of the cooling passages 208 are shown in greater detail in which a plenum or manifold 226 is provided at a base portion 228 of one or more cooling passages 208 such that cooling air can be provided to one or more outlets 212 located at a base portion 228 of the combustor tower 202. In FIG. 10, the outlets 212 are in fluid communication with the manifold 220 such that one cooling passage 208 can fluidly communicate with the plurality of outlets 212. As can be seen in FIG. 10, cooling air travelling through the cooling passages 208 impinges upon a hot corner portion of the liner 80*b*, before exiting the outlets 212 which directs cooling air on a radial portion of the liner 80*b* directly adjacent to the outlets 212 thereof, and then onto any combustor component 97 (not shown in the orientation of FIG. 10).

Additionally, the cooling passage 208 can have a tapered portion 218 adjacent to the inlet 210, which converges, from the inlet 210 and toward the plenum 226 at a distal portion thereof. The cooling passage 208 can have a metering function (such as that shown by a minimum-area depending portion 214 in FIG. 10) to limit or set the flow of the cooling air within the cooling passage 208. As would be apparent to one skilled in the art, any cross-sectional features of the cooling passage 208 could be utilized, including rectangular, round, and other polygonal shapes in non-limiting examples. Another embodiment of the cooling passage 208 can include a large area outlet 212, which provides lower velocity air to fill and purge the gap 207 between component 200 and combustor component 97 with a given velocity air that can be set by the exit area prescribed. This allows the limiting flow to be set within cooling passage 208 and the exit velocity determined by the area of outlet 212.

Figure 11:
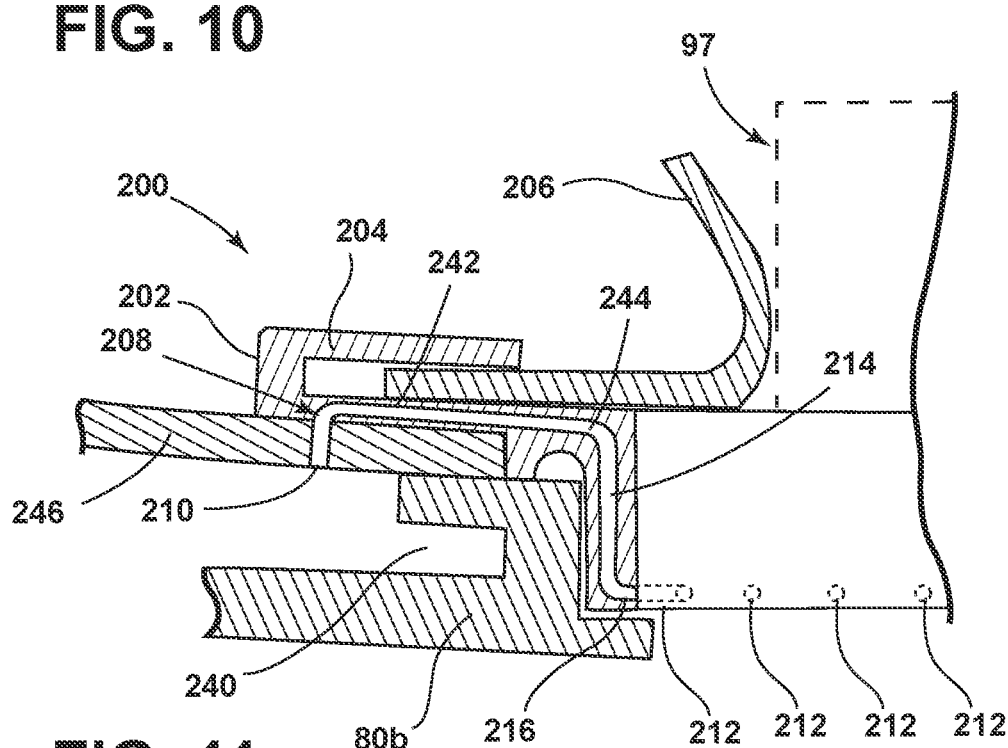
FIG. 11 is a partial, cross-sectional view of the combustor liner mount with the cooling passages receiving cooling air from a post-impingement combustor liner cooling flow being delivered for liner cooling of the engine.

Turning to FIG. 11, a sixth embodiment of the air cooling passages 208 through the ignitor tower stack 202, 204, 206 making up the combustor liner amount 200 is shown. In this embodiment, cooling air is provided from a post-impingement cavity 240 of the combustor 30, as opposed to the pre-impingement embodiments shown in FIGS. 9-10. In FIG. 11, the cooling passage 208 has an inlet 210 from the post-impingement cavity of the liner 80b of the combustor 30, which extends upwardly through the liner 80b and into the igniter tower 202 and combustor tower cap 204. It should be appreciated that the cooling passage 208 has a lateral portion 242 and a curved portion 244 that extends into the depending portion 214 and to the peripheral portion 216, terminating at the outlets 212.

As would be apparent to one skilled in the art, the number of cooling passages 208 provided in the one or more of the ignitor tower stack 202, 204, 206 making up the combustor liner mount 200, and in outer liner baffle 246 as shown in the embodiment of FIG. 11, any of which can be selected for any given application, the particular number of cooling passages 208 is exemplary and should not be construed as limiting the scope of the invention. By providing cooling passages with the vertically-offset or non-collinear portions as described herein, cooling air efficiency is improved. In addition to providing convective cooling closer to the higher temperature area of the combustor component 200 and the inner hot side flow path of the combustor outer liner 80b, the temperature of the metal adjacent the ferrule can also be lowered by the extended-length and vertically-offset or non-collinear nature of the cooling passages 208 provided within one or more of the ignitor tower stack 202-206 comprising the combustor liner mount 200. The extended length, changing directions, and changes in internal cross-section for the cooling passages 208 provide additional cooling efficiency and more convective surface area to cool and purge the ignitor tower stack making up the combustor liner mount 200 and the combustor component 97.

It should be understood that the vertically-offset or non-collinear portions of the cooling passages 208 can comprise one or more of an arcuate portion, an angled portion, a change in direction, discrete inner dimensions, a narrowing or converging taper, a widening or diverging taper, and a manifold as described or illustrated in the figures. It should be appreciated that the vertically-offset or non-collinear portions of the cooling passages 208 provide for improved cooling efficiency or increased convective surface area to improve the cooling thereof. The improved cooling can be applied to the combustion liner mount or the combustion component as well as the additional interconnected elements. The improved cooling can reduce local temperatures often prone to damage or distress resultant from the high temperatures associated with operation. As such, component life and time-on-wing is increased.

The invention includes flow passages provided in the combustor liner mount 200, which can have a change in vertical distance between the inlet of a cooling passage therefor and its corresponding outlet, which has the net effect of placing the outlet for the cooling air directly adjacent to the combustor component 97, and specifically, the portion of the combustor component 97 located directly adjacent to the hot side flowpath. In addition, the path taken by the cooling passages also provides cooling through one or more of the elements making up the combustor liner mount 200 in portions thereof directly adjacent to the hot side flowpath as well.

While the elements of this invention have been described in the context of a combustor for a gas turbine engine, it will be understood by those skilled in the art that the combustor liner mount 200 and the combustor component 97 can also be located in other areas of a gas turbine engine, such as a HP compressor, HP turbine, and LP turbine, without departing from the scope of this invention. One skilled in the art would simply be able to locate the combustor liner mount 200 and the combustor component 97 in these other areas of the gas turbine engine with ordinary engineering skill in this technological area.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A combustor for a gas turbine engine comprising:
   a combustor liner defining a combustion chamber, wherein the combustor liner has at least one opening;
   a combustor liner mount received in the at least one opening of the combustor liner and having an igniter tower;
   at least one continuous cooling passage defined solely within the igniter tower having an inlet defining an inlet axis and an outlet defining an outlet axis, wherein the inlet axis is not collinear with the outlet axis; and
   a combustor component received in the combustor liner mount, wherein the combustor component has an inward portion in register with the combustion chamber and near to the outlet;
   whereby the combustor is configured to direct a flow of cooling air external of the combustor liner to the inlet, through the at least one cooling passage, and out of the outlet to cool at least one of the combustor liner mount and the combustor component.

2. The combustor of claim 1 wherein the combustor component comprises an igniter or a borescope plug and the combustor liner mount comprises an igniter stack or borescope plug mount.

3. The combustor of claim 1 wherein the at least one cooling passage comprises an arcuate portion disposed between the inlet and the outlet thereof.

4. The combustor of claim 1 wherein the at least one cooling passage comprises an angled portion disposed between the inlet and the outlet thereof.

5. The combustor of claim 1 wherein the at least one cooling passage includes a change in direction between the inlet and outlet thereof.

6. The combustor of claim 1 wherein the at least one cooling passage has a plurality of inner dimensions between the inlet and outlet thereof.

7. The combustor of claim 1 wherein the at least one cooling passage includes at least one of a narrowing taper extending into the at least one cooling passage from the inlet thereof, and a widening taper extending into the at least one cooling passage from the outlet thereof.

8. The combustor of claim 1 wherein the at least one cooling passage includes a manifold which distributes air passing through the at least one cooling passage to a plurality of outlets of the at least one cooling passage fluidly connected to the manifold.

9. The combustor of claim 1 wherein the outlet of the at least one cooling passage comprises an opening adjacent a base of the combustor liner mount positioned adjacent to the combustor component.

10. The combustor of claim 1 wherein the igniter tower is unitary with the combustor liner.

11. A combustor for a gas turbine engine comprising:
a combustor liner defining a combustion chamber, wherein the combustor liner has a wall defining an inner surface and an outer surface, and with at least one opening extending from the outer surface;
a combustor liner mount received in the at least one opening of the combustor liner and having an igniter tower;
at least one continuous cooling passage defined solely within the igniter tower having an inlet defining an inlet axis and an outlet defining an outlet axis, wherein the inlet axis is not collinear with the outlet axis, and the outlet is above the inner surface of the outer wall; and
a combustor component received in the combustor liner mount, wherein the combustor component has an inward portion in register with the combustion chamber and near to the outlet;
whereby the combustor is configured to direct a flow of cooling air external of the combustor liner to the inlet, through the at least one cooling passage, and out of the outlet to cool at least one of the combustor liner mount and the combustor component.

12. The combustor of claim 11 wherein the combustor component comprises an igniter or a borescope plug and the combustor liner mount comprises an igniter stack or borescope plug mount.

13. The combustor of claim 11 wherein the at least one cooling passage comprises an arcuate portion disposed between the inlet and the outlet thereof.

14. The combustor of claim 11 wherein the at least one cooling passage comprises an angled portion disposed between the inlet and the outlet thereof.

15. The combustor of claim 11 wherein the at least one cooling passage includes a change in direction between the inlet and outlet thereof.

16. The combustor of claim 11 wherein the at least one cooling passage has a plurality of inner dimensions between the inlet and outlet thereof.

17. The combustor of claim 11 wherein the at least one cooling passage includes at least one of a narrowing taper extending into the at least one cooling passage from the inlet thereof, and a widening taper extending into the at least one cooling passage from the outlet thereof.

18. The combustor of claim 11 wherein the at least one cooling passage includes a manifold which distributes air passing through the at least one cooling passage to a plurality of outlets of the at least one cooling passage fluidly connected to the manifold.

19. The combustor of claim 11 wherein the outlet of the at least one cooling passage comprises an opening adjacent a base of the combustor liner mount positioned adjacent to the combustor component.

20. The combustor of claim 11 wherein the igniter tower is unitary with the combustor liner.

\* \* \* \* \*